(12) United States Patent
Swanson

(10) Patent No.: US 12,008,607 B2
(45) Date of Patent: Jun. 11, 2024

(54) CONNECTING CUSTOMERS TO EMPLOYEES

(71) Applicant: Bonder, Inc., San Jose, CA (US)

(72) Inventor: Scott Swanson, San Jose, CA (US)

(73) Assignee: Bonder, Inc., San Jose, CA (US)

( * ) Notice: Subject to any disclaimer, the term of this patent is extended or adjusted under 35 U.S.C. 154(b) by 141 days.

(21) Appl. No.: 17/467,874

(22) Filed: Sep. 7, 2021

(65) Prior Publication Data

US 2022/0076301 A1    Mar. 10, 2022

Related U.S. Application Data

(60) Provisional application No. 63/074,629, filed on Sep. 4, 2020.

(51) Int. Cl.
| | |
|---|---|
| *G06Q 30/02* | (2023.01) |
| *G06Q 30/016* | (2023.01) |
| *G06Q 30/0601* | (2023.01) |
| *H04W 4/02* | (2018.01) |
| *H04W 4/029* | (2018.01) |

(52) U.S. Cl.
CPC ....... *G06Q 30/0281* (2013.01); *G06Q 30/016* (2013.01); *G06Q 30/0641* (2013.01); *H04W 4/023* (2013.01); *H04W 4/029* (2018.02)

(58) Field of Classification Search
CPC ............. G06Q 30/0281; G06Q 30/016; G06Q 30/0641; H04W 4/023; H04W 4/029
See application file for complete search history.

(56) References Cited

U.S. PATENT DOCUMENTS

| | | | | |
|---|---|---|---|---|
| 9,454,761 | B2 * | 9/2016 | Tuchman | H04L 67/51 |
| 2013/0091452 | A1 * | 4/2013 | Sorden | G06F 30/20 |
| | | | | 715/771 |
| 2015/0302415 | A1 * | 10/2015 | Reines | G06Q 30/016 |
| | | | | 705/7.19 |
| 2016/0012495 | A1 * | 1/2016 | Hanson | H04W 4/029 |
| | | | | 705/346 |
| 2016/0247165 | A1 * | 8/2016 | Ryabchun | G06Q 30/0201 |
| 2019/0340658 | A1 * | 11/2019 | Udupa | G06Q 30/0281 |

OTHER PUBLICATIONS

Benefits Analysis of Live Customer Support Chat in E-Commerce Websites: Dimensions of a New Success Model for Live Customer Support Chat (Year: 2011).*

* cited by examiner

*Primary Examiner* — Alexandru Cirnu
(74) *Attorney, Agent, or Firm* — Dergosits & Noah LLP

(57) ABSTRACT

Facilitating connections between a customer and an employee of a business is described. Once the customer is within a proximity of a business, the customer can choose to interact with an employee of the business. The customer can select a product or section of the business and post a request or question. In response, an employee with expertise in the subject matter of the request or the question, can chose to respond to the customer. Thus, the customer can get help prior to entering the store. In addition, the customer can request the employee to facilitate the purchase of a product via the system described herein and leave the product in a pick-up area. After the interaction is complete, the customer can reopen the conversation at a later time with the same employee. As such, the system enables better customer engagement, a better buying experience, and a better post-purchase experience.

20 Claims, 6 Drawing Sheets

CONNECTING CUSTOMERS TO EMPLOYEES

RELATED APPLICATIONS

The present application claims priority to U.S. Provisional Patent Application Ser. No. 63/074,629, entitled Connecting Customers to Employees, filed on Sep. 4, 2020.

TECHNICAL FIELD

This disclosure relates to connecting customers to employees, and in particular facilitating connections between customers and employees prior to entering a business and after leaving the business.

BACKGROUND

Retails stores often have websites or applications that allow potential customers to see details regarding the products available for sale. The website or application may include details such price, dimensions, delivery time, and other related details. Nevertheless, a potential customer may have specific or additional questions regarding one or more products. To get these questions answered, the potential customer may call the store or to the store to get their questions answered by a knowledgeable employee.

SUMMARY

Some of subject matter described here includes a method of connecting customers with employees of a retail business, the method comprises, at least some of the following steps. Determining, by a server, that a first device is in proximity of a retail business, the retail business being associated with the employee and the first device being associated with the customer, wherein determining that the first device is in proximity further includes: determining a geolocation of the first device; generating a geofence around the retail business; and determining that the first device is within the geofence. Retrieving, by the server, from a repository associated with the retail business, data indicative of the products sold in the retail business and of the sections in the retail business. Transmitting, by the server, a first set of data indicative of a customer graphical user interface (GUI) to the first device, wherein the customer GUI includes the products and sections. Transmitting, by the server, instructions to display the customer GUI on a display of the first device. Transmitting, by the server, a second set of data indicative of an employee GUI to the second device and instructions to display the employee GUI on a display of the second device. In response to the customer selecting, on the customer GUI, a first product or a first section, establishing, by the computing device, a communication channel between the first device and a second device associated with the employee, wherein the employee is associated with the first product or first section. In response to establishing the communication channel, transmitting, by the server, a chat GUI to the first device and the second device, wherein the chat GUI is operable to transmit communication data over the communication channel. And storing, by the server, the communication data from the chat GUI.

DETAILED DESCRIPTION

Figure 1:
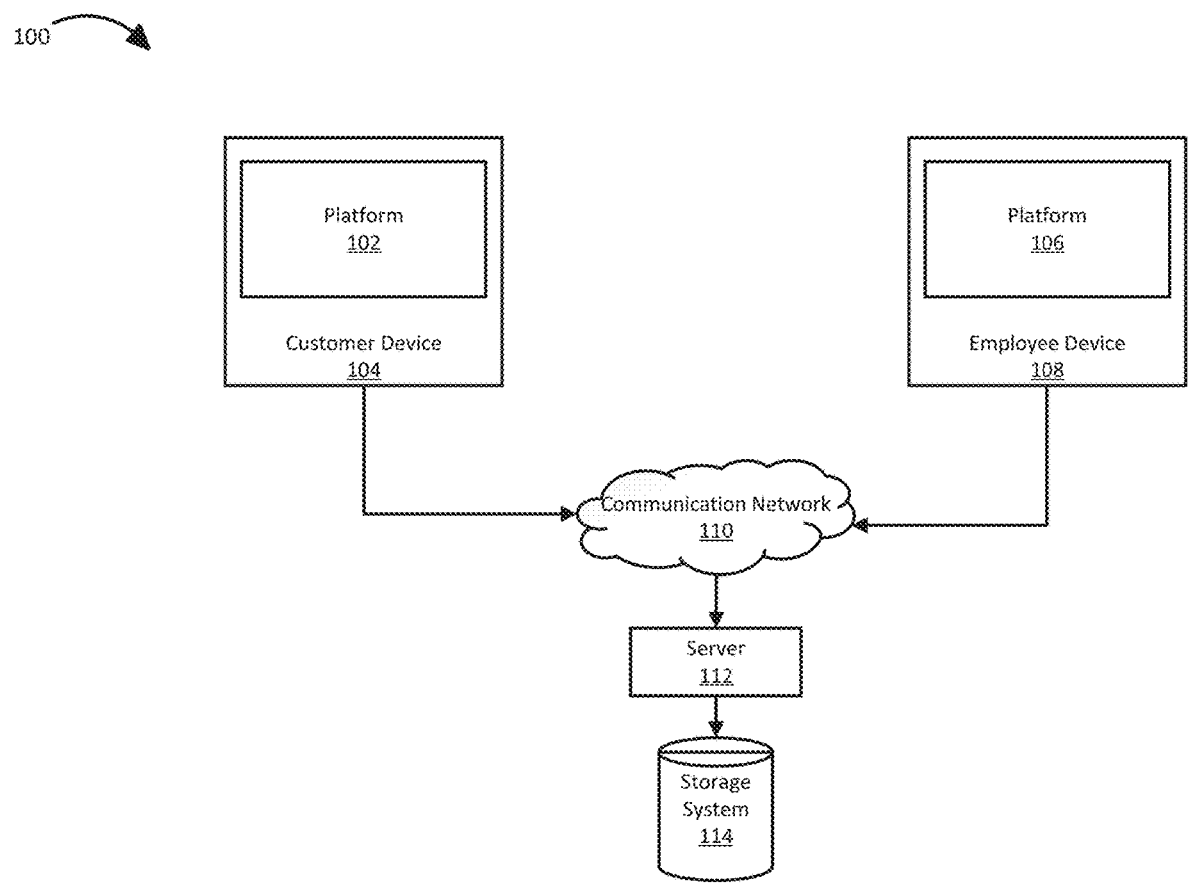
FIG. 1 is a block diagram of an environment in which the disclosed embodiments can be implemented.

The embodiments set forth below represent the necessary information to enable those skilled in the art to practice the embodiments and illustrate the best mode of practicing the embodiments. Upon reading the following description in light of the accompanying figures, those skilled in the art will understand the concepts of the disclosure and will recognize applications of these concepts that are not particularly addressed herein. It should be understood that these concepts and applications fall within the scope of the disclosure and the accompanying claims.

The purpose of the terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like, refer to any connection or coupling, either direct or indirect, between two or more elements. The coupling or connection between the elements can be physical, logical, or a combination thereof.

Retail businesses are a large part of many people's day to day lives. Even with the progress of online shipping and delivery businesses, it has become second-nature to go to retails stores to view merchandise, return purchased merchandise, view options, or the like. In many ways the retails business experience has not changed in decades. A potential customer enters a store, looks for an item they interested in, and they buy it. Or in some situations, the potential customer has a question and they find an employee of the store to get their questions answered. Due to this stagnation in the in-person retail experience, among other issues, customers have elected to spend their online shopping, while accepting to forego the advantage in-person shopping. However, the present disclosure addresses some issues, described below, that will help better the in-store shopping experience.

First, the level of customer engagement with a retail business needs to be improved. Currently, a customer interacts with a retail business in one of three ways: in-person at the store, a phone call, or online. For example, a customer may go to a store looking to buy a new laptop. Once at the store, the customer may wander through the section with the laptops and may have some questions. They then look for an employee by wandering through aisles, and once they find an employee, the employee may not be the most knowledgeable employee about laptops. Similarly, the same issue can occur over the phone or online. In other words, the customer has no way to know who to approach about particular products.

Second, the buying experience, especially when compared to online shopping, is not worthwhile for many customers. The buying experience, in the current state of the art, has not been updated in decades. The buying experience is fairly generic: decide to buy a product, go to an appropriate store, find the product, check-out. This process is inundated with issues such as low efficiency, frustration from trying to find the right product, and other issues. For example, a customer may want to buy shoes with a particular color scheme. However, once in a shoe store, they have to look through boxes or find an employee and describe the colors to them. The similar process can be applied to other products such as cell phones, bags, clothing, and other products that have varying features. As such, the buying experience is marred with a combination of negative events and/or interactions.

Third, the post-purchase experience leaves many customers wanting more. For example, currently, when a customer buys a product and leaves the store, they are rarely provided further support. They are provided with a customer support number or website but need to come back to the store to address any additional issues. For instance, if a customer interacts with a sales representative at the store who convinces them to buy a product that requires assembly, the customer has no way to contact that representative unless they go back to the store. In many cases, the customer may have questions about how to assemble the product, or the customer needs help finding a part that was missing in the original packaging. As such, the post purchase experience is not affiliated with place of purchase, but rather a detached third-party service such as a customer service center.

The present disclosure addresses these and other issues by providing a platform to enable interaction between a customer and an employee. The platform can be a smart application that can be used on a network-connected device. The platform can include a geolocation feature that detects the location of a customer and provides portals (e.g., GUIs, webpages, or application windows) for each of the stores located nearby. Subsequently, the customer can choose a particular store and view the products by the store. In some embodiments, the products can be categorized based on intended use, manufacturer, or other appropriate categories. Once the customer selects a product or category, the customer may be prompted to interact with as employee of the store. If the customer elects to do so, the platform establishes a communication channel between the customer and the employee. In some embodiments, the communication channel can be between the customer and all the employees of the store. The employee with the expertise in the product or category that the customer selected, will then communicate with the customer. This can include finding the product, prompting a purchase via the platform, and leaving the product at a pick-up for the customer. Moreover, the communication channel remains active after the purchase, which allows the customer to follow-up with post-purchase questions directed to the same employee.

For example, a customer can go to a Best Buy store. The platform will recognize, once the customer's device is within a certain distance of the store, that the customer is near Best Buy. Subsequently, the platform will populate the Best Buy store details on the platform (e.g., via a separate GUI, webpage, or window). For instance, the platform can list all of the departments for the Best Buy store in the customer's current location. The customer, after or before entering the store, can post a question in a particular department. The question can be sent to all the employees of the store, the employees within that department, or to a particular employee. After doing so, the customer can get an answer on the platform from a particular employee, via a digital message, video call, audio message, or get in-person assistance. After the customer returns home, the customer will still have direct messaging contact to the particular employee they spoke to earlier.

Environment

Turning to FIG. 1, FIG. 1 is a block diagram of an environment 100 in which the disclosed embodiments can be implemented. In FIG. 1, customer can use customer device 104 to use platform 102. Similarly, employee can use employee device 108 to use platform 106. In some embodiments, platform 102 and 106 can be a smart application, for use on network-connected devices such as customer device 104 and employee device 108. Server 112 and/or storage system 114 can store an executable file for generating the application. The executable file can also be stored at a different location. A customer and employee can subsequently download the application on their devices (i.e., 104 and 108). The user device 104 and 108 can be any network-connected computing device capable of accessing the server 112 over a communication network 110 and capable of sending necessary data, such as a laptop, smartphone, tablet, etc.

The following paragraphs describe embodiments from a user-side portion of the communication platform which is implemented as a smart application (also referred to as "platform"). Each user of the platform can download the application on their respective devices. For example, a customer using customer device 104 can download platform 102 onto customer device 104. By doing so, the customer can communicate to the employee as required to provide sufficient information during a pre-purchase or post-purchase interaction.

For example, a customer may be parked in the Home Depot parking lot. Rather than go into the store and look for an item (e.g., paint or tools), the customer can use platform 102 to connect with an employee in a desired section of the Home Depot. In some embodiments, the platform 102 can automatically detect, based on the geolocation, that the user is near a Home Depot. Accordingly, the platform 102 can populate the sections, products, and other details about the Home Depot. The customer can then connect with an employee from a particular section and request a particular product, or simply ask questions.

In some embodiments, the platform 102 and platform 106 are the same smart application. However, each user can select a profile based on their role. For example, a customer, during the initial set-up of the platform 102 on customer device 104, can select that they are a customer. This can lead to a different user experience (e.g., via a different GUI) such as having access to multiple stores and being able to contact store employees. Alternatively, an employee can select an employee profile (e.g., employee GUI). This can include, for example, registering using the company email, getting permission from an account holder, or the like. The employee may then have access to altering available products, setting their expertise categories/level, and connecting with customers on the platform.

For example, server 112 and/or storage system 114 may store a registry of employee names and emails for certain businesses. The businesses can register themselves onto the platform or the platform can populate the information from other sources. Thus, when an employee uses platform 106, he/she can log in using the company email ID, name, employee number, or other identification.

In FIG. 1, the user (e.g., customer and employee) can select a personal profile and be presented with a modified GUI on platform 102 and 106. The GUI be representative of the profile. In other words, a customer would see a different GUI than the employee. For example, the GUI on a platform 102 may show a customer the nearby stores, the available products, and sections of the store. The GUI on platform 106 may show an employee incoming questions from customers, fellow employees asking for help, or other interactions that normally occur in-store between employees and customers and between co-employees.

In some embodiments, server 112 and/or storage system 114 can be local with respect to the store, customer device 104, and/or employee device 108. For example, each store can have its own server and/or storage system such that the platform 102 has to connect via communication network 110 to the local server and/or storage system to retrieve the details about the store (e.g., employee registry, sections, or products). For instance, the connection can be automatically triggered based on proximity of customer device 102 or based on a previous connection.

In some embodiments, environment 100 facilitates an interaction between customer device 104 and employee device 108. Customer device 104, upon being in proximity to a store, can populate a GUI with the store details on platform 102. The customer can then elect to contact an employee at the store. The customer can do so, for example, after selecting a particular product, a section of the store, or another filter. Upon contact, the customer device 104, via communication network 110, can establish a communication channel with employee device 108. This can result in an alert from platform 106 appearing on employee device 108. The employee, via platform 106, can enter a chat GUI to interaction with the customer.

In some embodiments, when the customer wants to interact with an employee, the platform 102 opens a communication channel with all the employees in the store. On the employee's side, each employee receives an alert and the GUI can prompt each employee to take responsibility for the customer request. For example, a customer, outside of a Best Buy, can ask for help with selecting the best noise cancelling headphones. The request can be sent to every employee of the Best Buy near the customer's location. The employees can receive an alert, with a prompt to indicate that they'll take responsibility. After which, the employee with knowledge about the subject matter of the request can take responsibility. In some embodiments, when a request has been unanswered for a certain time period (e.g., over five minutes), the platform 106 can escalate the issue. For example, the platform 106 can alert the employee(s) again or alert a higher-level employee.

In some embodiments, the server 112 and/or storage system 114 can store the data from an interaction to allow for post-purchase or other future interaction between the parties. For example, a customer can ask a question about a laptop at Best Buy on platform. An employee, via platform 106, can address the question and subsequently, the customer can purchase the laptop. The customer, a few days later, may have questions about using the laptop, additional features, or the like. To get these questions answers, the customer can use platform 102 to reopen the conversation with the same employee. In this way, all the histories of interactions can be stored in the server 112 and/or storage system 114 and reopened at a later time.

In some embodiments, the platform 102 and 106 can include a payment GUI. The payment GUI can facilitate a purchase without have the customer come into the store. For example, a customer can be chatting with a Home Depot employee regarding a type of tile. The employee may inform the customer that it is available. The customer can then ask the employee to proceed with the purchase of the tile. The employee can then use platform 106 to, for example, input the item or scan the barcode to on the payment GUI. Platform 102 can then reflect the to-be-purchased items, and the customer can make the purchase as they would in any other online-shopping scenario. After the transaction has completed, the platform 106 can provide an alert to the employee, and he/she can drop-off the purchases tiles in a pick-up area.

Method of Use

Figure 2:
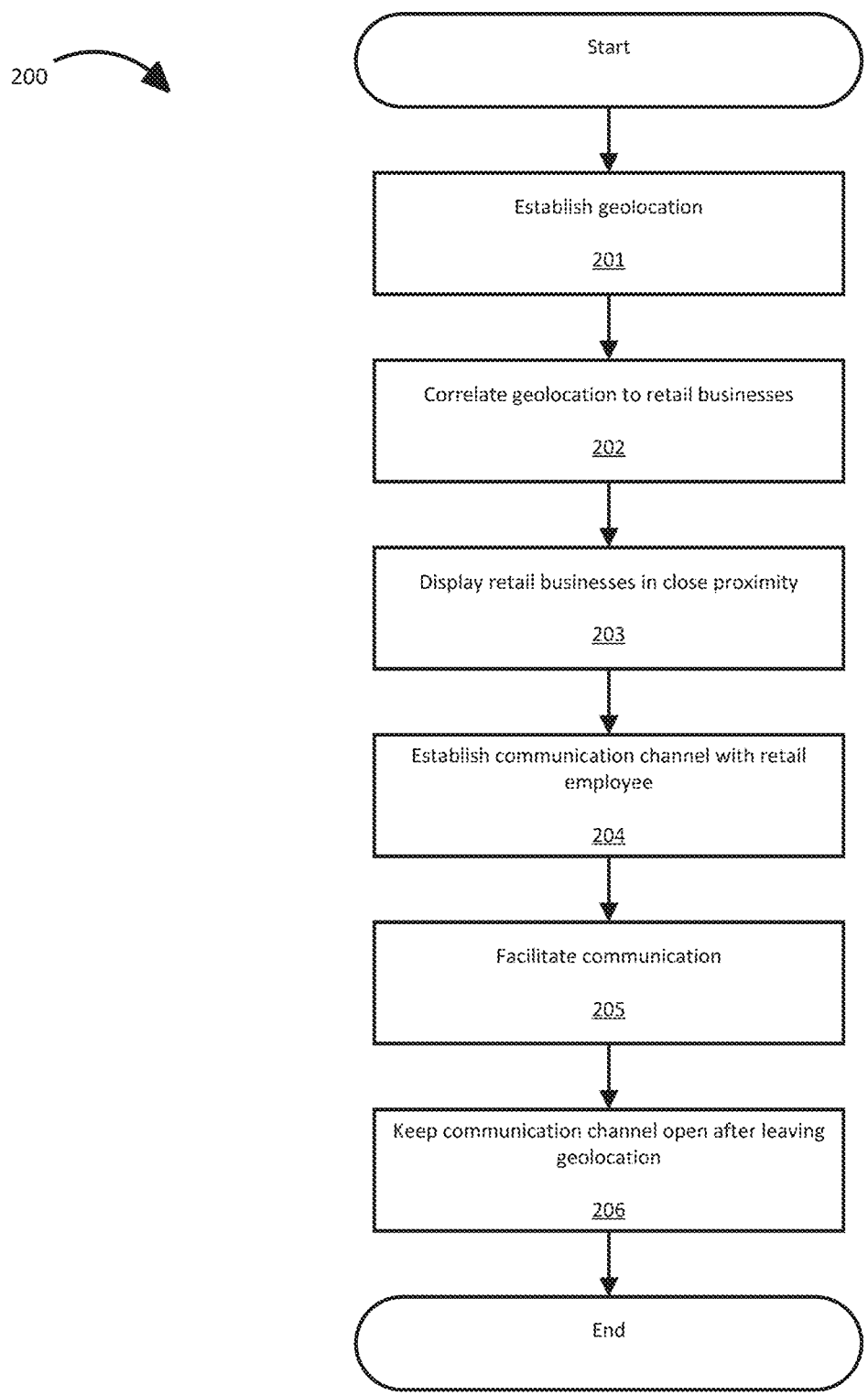
FIG. 2 is a flowchart of the process from the perspective of the customer device.

FIG. 2 is a flowchart of the process from the perspective of the customer device. The general interaction is described in the following sentences. First, a customer taps on a specific department and posts a question/request to talk to an employee (the customers can only see their own message, an automatic message can appear that an employee will get to them shortly). Second, all of the employees get a notification and can see the customer request in a group chat. This, one of the employees taps on the message with the customer, which opens up a 1on1 chat. When in chat, they can accept to help this specific customer by clicking a button "help this customer", which initiates the chat and removes this customer request from the list of unhandled customers in the bucket. Fourth, In the chat they can agree on meeting in a specific department or just chat online.

In particular, from the customer perspective, the process begins at 201, when the geolocation is determined. The geolocation can be derived from the GPS system on the customer device (e.g., an iPhone). Using the geolocation, the platform can determine which stores are nearby. For example, the platform can access a database of addresses or coordinates (e.g., Google maps API). At 203, the platform can display the nearby stores. In some embodiments, the customer can search for stores, in addition to or as an alternate to having the platform auto-populate the nearby stores.

At 204, the platform can open a communication channel between the customer and a retail employee based on the customer's selection (e.g., a product or section). At 205, the platform can facilitate the conversation via text, voice, video, or other communication means. After the interaction is completed, at 206, the platform keeps the communication channel open even after the customer has left the location.

Figure 3:
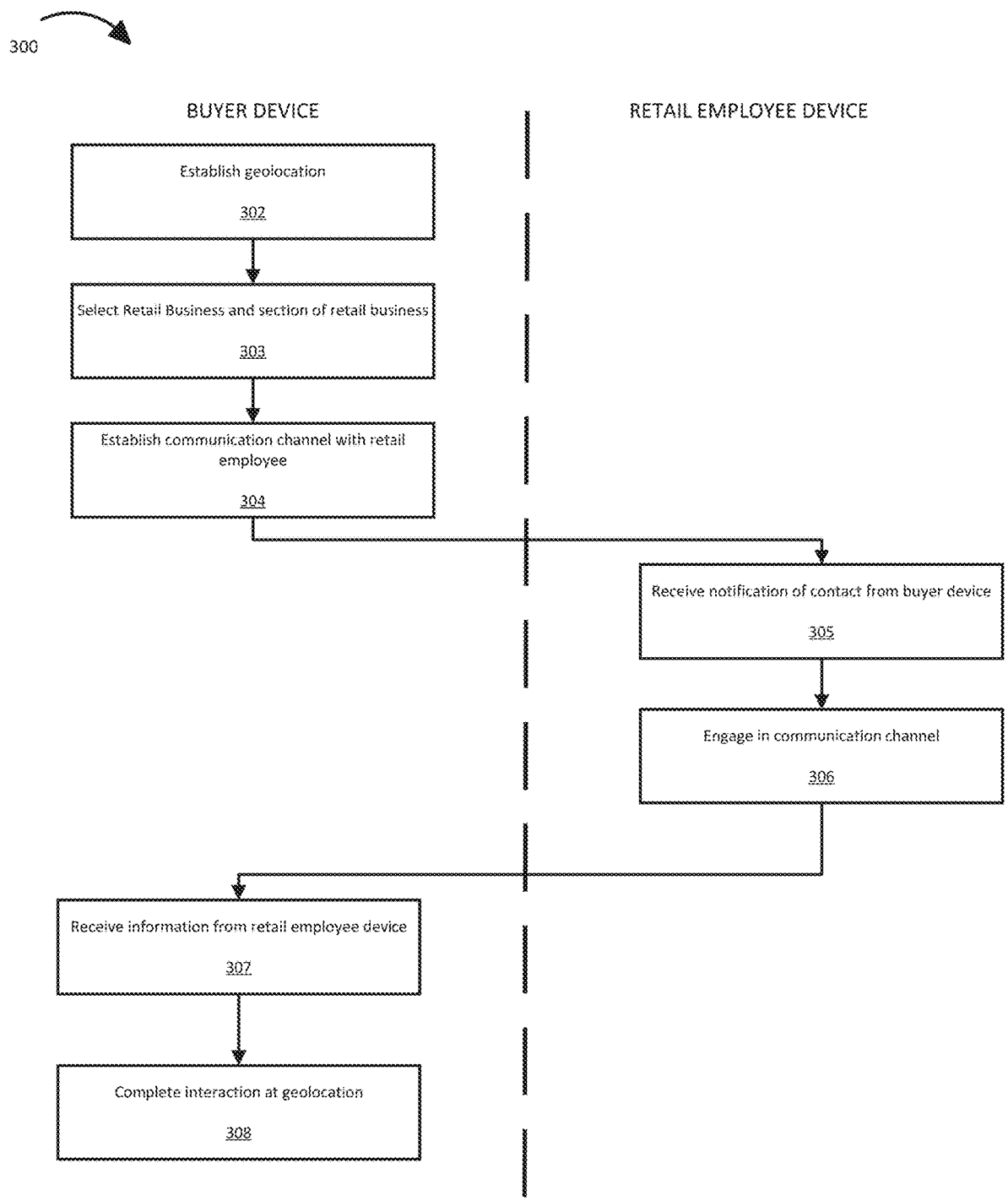
FIG. 3 is a block diagram of the exchange between the customer and retail employee devices.

FIG. 3 is a block diagram of the exchange between the customer and retail employee devices. Blocks 302, 303 and 304 are similar to blocks 202, 203, and 204 of FIG. 2. At 305, the employee can receive notification indicating that a customer has posted a request on the platform. In response, the employee can engage in the communication channel at 306. This can include, as mentioned above, answering the request, facilitating a purchase, arranging an in-person meeting, a video call, or other forms of communication. In return, at 307, the customer sees the response and completes the interaction at 308.

Figure 4:
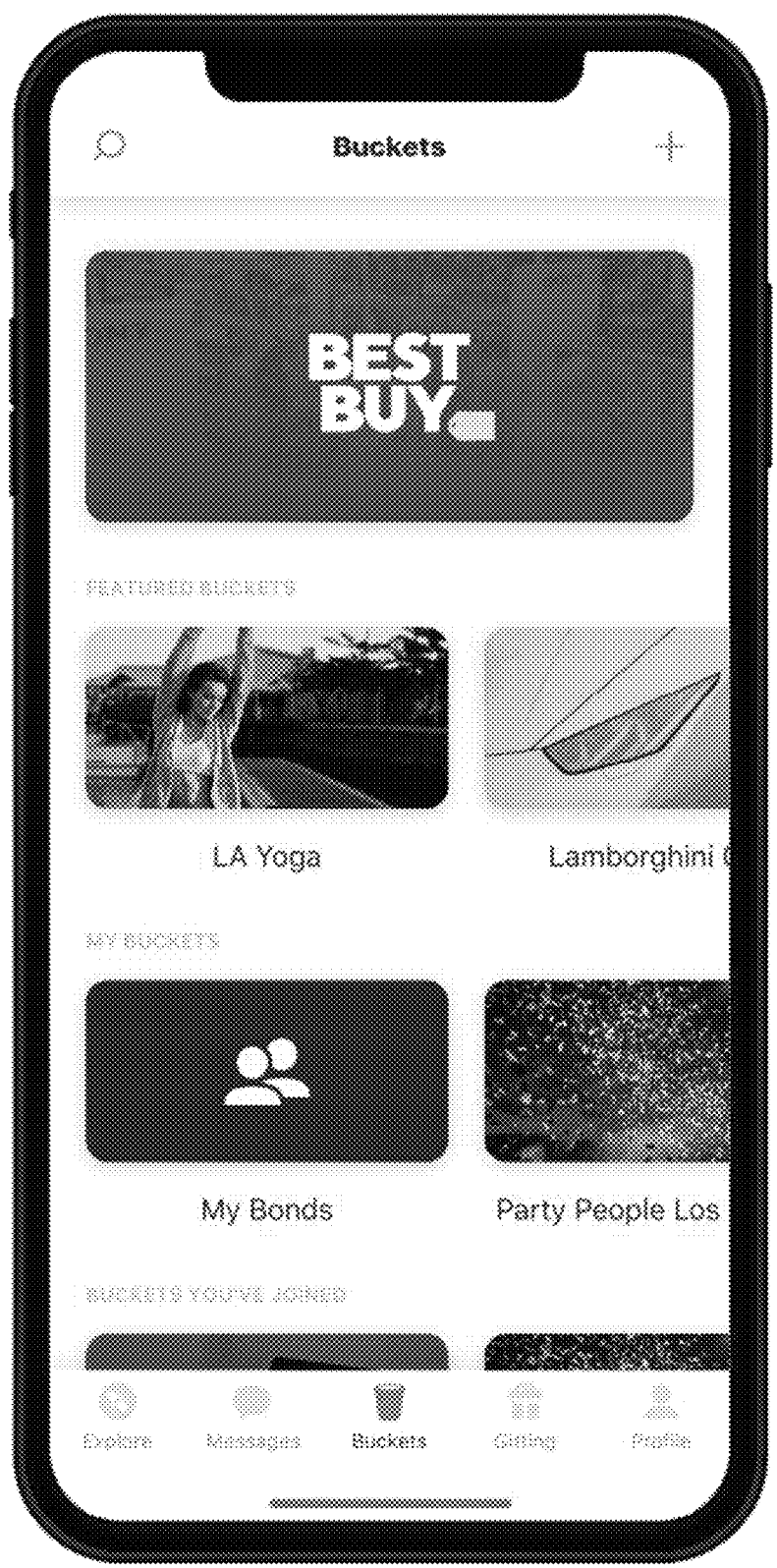
FIG. 4 is an embodiment of a graphical user interface from a customer perspective.

FIG. 4 is an embodiment of a graphical user interface from a customer perspective. In this embodiment, the interface indicates that the customer is near a Best Buy. As such, the customer can click on the Best Buy icon, and proceed in the manner described herein.

In some embodiments, the platform includes other GUIs based on the customers retail history, interests, location, and profile. For example, in addition to being in proximity to a Best Buy, the customer may also be in proximity to an LA Yoga. In some embodiments, LA Yoga can be a group that the customer is affiliated with that may contribute to the products or services that the customer is interested in.

Figure 5:
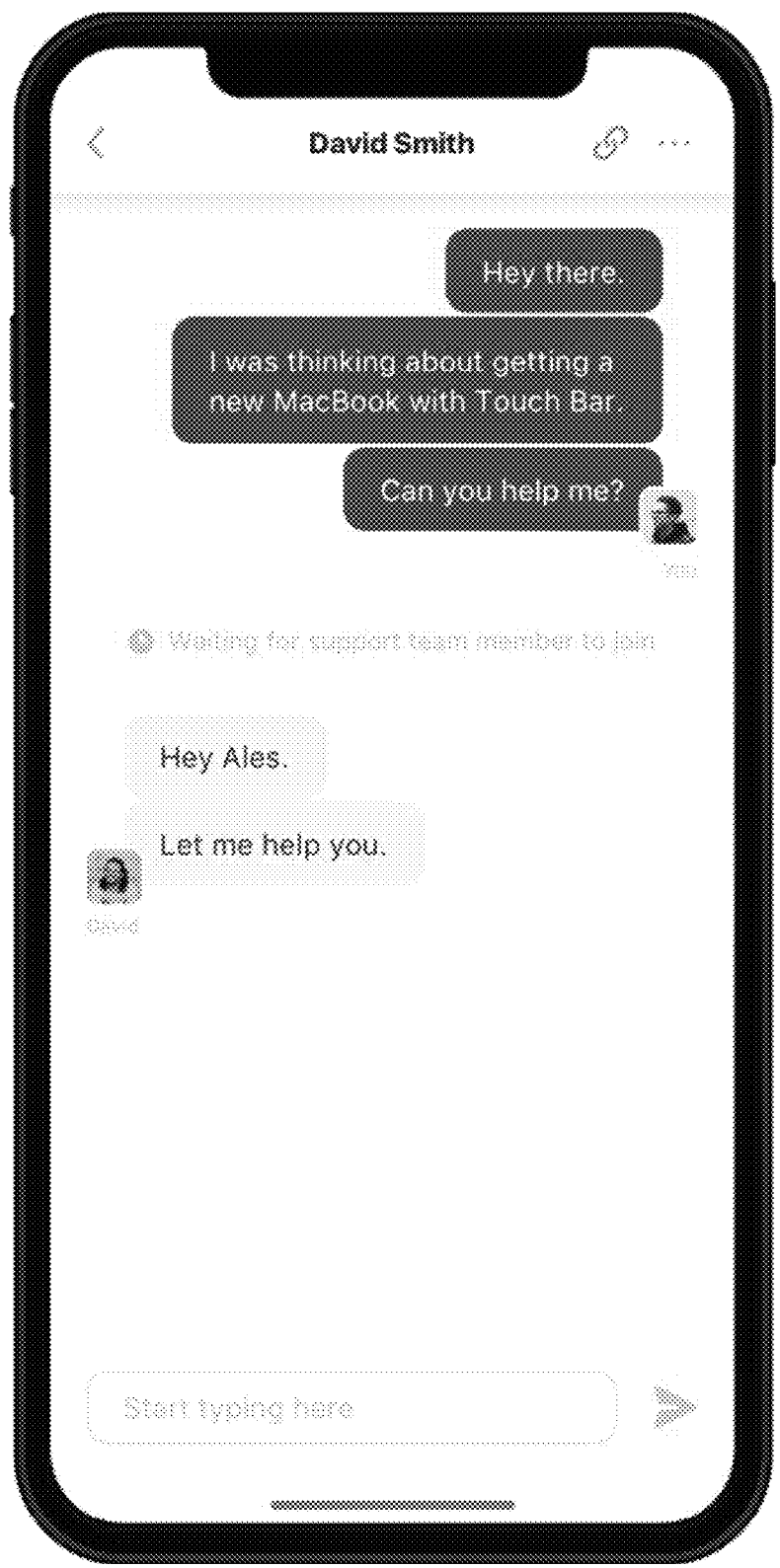
FIG. 5 is an embodiment of a chat GUI.

FIG. 5 is an embodiment of a chat GUI. Once the customer has selected the Best Buy icon, the customer can enter a chat conversation with a Best Buy employee. Here, the customer wants to buy a new MacBook. As such, David Smith, an employee of the nearby Best Buy has responded and will help the customer with the purchase.

System

Figure 6:
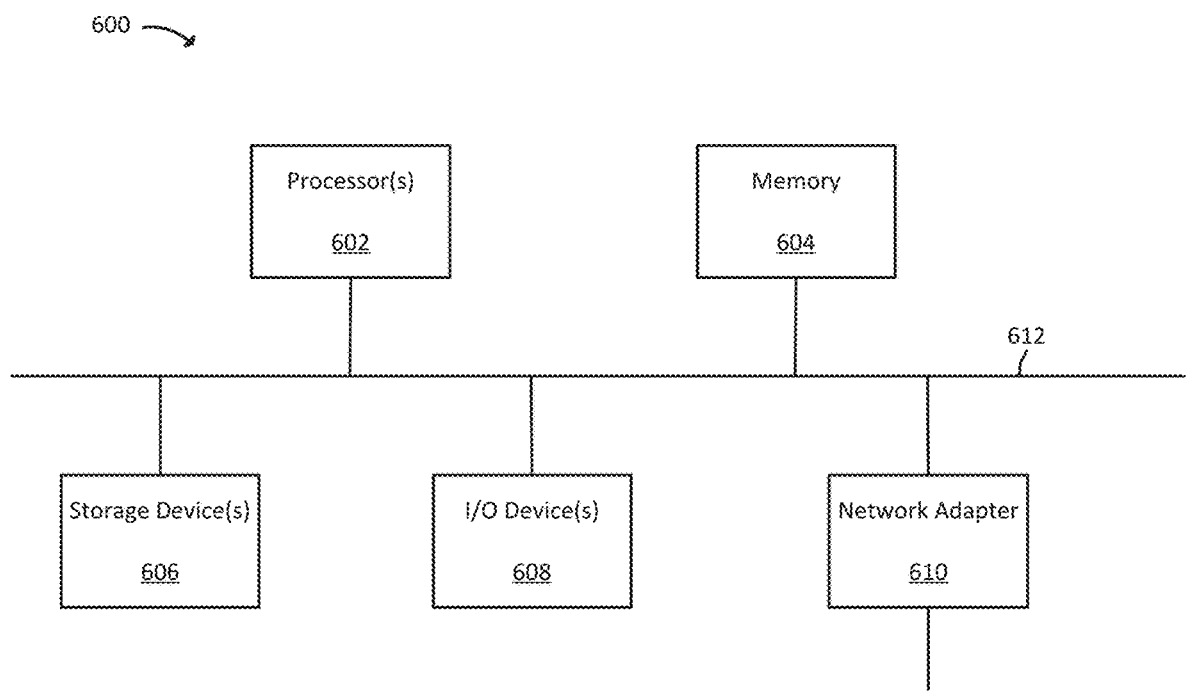
FIG. 6 is a block diagram illustrating a diagrammatic representation of a machine in the example form on a computer system operable to perform aspects of the disclosed technology.

FIG. 6 is a block diagram of a computer system that may be used to implement features of some of the disclosed technology. The computing system 600 may be a modular reporting device, a reporting system, a server computer, a client computer, a personal computer (PC), a user device, a tablet PC, a laptop computer, a personal digital assistant (PDA), a cellular telephone, an IPHONE, an IPAD, a BLACKBERRY, a processor, a telephone, a web appliance, a network router, switch or bridge, a console, a handheld console, a (handheld) gaming device, a music player, any portable, mobile, handheld device, wearable device, or any machine capable of executing a set of instructions, sequential or otherwise, that specify actions to be taken by that machine.

The computing system 600 may include one or more central processing units ("processors") 602, memory 604, input/output devices 606 (e.g., keyboard and pointing devices, touch devices, display devices), storage devices 608 (e.g., disk drives), and network adapters 610 (e.g., network interfaces) that are each connected to an interconnect 612. The interconnect 612 is illustrated as an abstraction that represents any one or more separate physical buses, point to point connections, or both connected by appropriate bridges, adapters, or controllers. The interconnect 612, therefore, may include, for example, a system bus, a peripheral component interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus (i.e., FIREWIRE).

The memory 604 and storage devices 608 are computer-readable storage media that may store instructions that implement at least portions of the various embodiments. In addition, the data structures and message structures may be stored or transmitted via a data transmission medium (e.g., a signal on a communications link). Various communications links may be used (e.g., the Internet, a local area network, a wide area network, or a point-to-point dial-up connection). Thus, computer readable media can include computer readable storage media (e.g. non-transitory media) and computer readable transmission media.

The instructions stored in memory 604 can be implemented as software and/or firmware to program the processor 602 to carry out actions described above. In some embodiments, such software or firmware may be initially provided to the computing system 600 by downloading it from a remote system through the computing system 600 (e.g., via network adapter 610).

The various embodiments introduced herein can be implemented by, for example, programmable circuitry (e.g. one or more microprocessors, programmed with software and/or firmware), or entirely in special-purpose hardwired circuitry (i.e., non-programmable circuitry), or in a combination of such forms. Special-purpose hardwired circuitry may be in the form of, for example, one or more application-specific integrated circuits (ASICs), programmable logic devices (PLDs), field-programmable gate array (FPGAs), etc.

Conclusion

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

Reference herein to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

From the foregoing, it will be appreciated that specific embodiments of the invention have been described herein for purposes of illustration, but that various modifications may be made without deviating from the scope of the invention. Accordingly, the invention is not limited except as by the appended claims.

I claim:

1. A method for connecting a customer with an employee, the method comprising:
   determining, by a server, that a first device is in proximity of a retail business, the retail business being associated with the employee and the first device being associated with the customer, wherein determining that the first device is in proximity further includes:
      determining a geolocation of the first device;
      generating a geofence around the retail business; and
      determining that the first device is within the geofence;
   retrieving, by the server, from a repository associated with the retail business, data indicative of the products sold in the retail business and of the sections in the retail business;
   transmitting, by the server, a first set of data indicative of a customer graphical user interface (GUI) to the first device, wherein the customer GUI includes the products and sections, the customer GUI being a part of a webpage or web application window being accessed via the Internet;
   transmitting, by the server, instructions to display the customer GUI on a display of the first device;
   transmitting, by the server, a second set of data indicative of an employee GUI to a second device associated with the employee and instructions to display the employee GUI on a display of the second device, the employee GUI being a part of a webpage or web application window being accessed via the Internet;
   in response to the customer selecting, on the customer GUI, a first product or a first section, establishing, by the computing device server, a communication channel between the first device and the second device via the Internet, wherein the employee is associated with the first product or first section;
   in response to establishing the communication channel, transmitting, by the server, a chat GUI to the first device and the second device, wherein the chat GUI is operable to transmit communication data over the communication channel; and
   storing, by the server, the communication data from the chat GUI.

2. The method of claim 1, further comprising:
   transmitting, by the server, a second set of data indicative of an employee GUI to a second device and instructions to display the employee GUI on a display of the second device, the second device being associated with an employee, wherein the employee is associated with the first product or first section; and
   further in response to the establishing the communication channel, transmitting the chat GUI to the second device.

3. The method of claim 1, the establishing the communication channel between the first device and the second device being further in response to receiving a user request to interact with an employee of the store.

4. The method of claim 1, further comprising providing, via the customer GUI, instructions on how to locate the first product or the first section.

5. The method of claim 1, the communication channel remaining open after a time of purchase, the method further comprising receiving, by the server, post-purchase questions directed towards a user of the second device.

6. The method of claim 1, the customer GUI being part of an application installed on the first device, further comprising, during a set-up of the application, receiving, by the server, data identifying the customer as a customer user.

7. A system comprising:
   a processor-based application stored on a non-transitory computer-readable medium, which when executed on a computer, will cause one or more processors to:
      determine that a first device is in proximity of a retail business, wherein determining that the first device is in proximity further includes:
         determining a geolocation of the first device;
         generating a geofence around the retail business; and
         determining that the first device is within the geofence;
      retrieve, from a repository associated with the retail business, data indicative of products sold in the retail business and of sections in the retail business;
      transmit a first set of data indicative of a customer graphical user interface (GUI) to the first device, wherein the customer GUI includes the products and sections, the customer GUI being a part of a webpage or web application window being accessed via the Internet;
      transmit instructions to display the customer GUI on a display of the first device;
      in response to the customer selecting, on the customer GUI, a first product or a first section, establish a communication channel between the first device and a second device via the Internet;
      in response to establishing the communication channel, transmit a chat GUI to the first device, wherein the chat GUI is operable to transmit communication data over the communication channel; and
      store the communication data from the chat GUI.

8. The system of claim 7, the processor-based application further causing the one or more processors to:
   transmit a second set of data indicative of an employee GUI to a second device and instructions to display the employee GUI on a display of the second device, the second device being associated with an employee, wherein the employee is associated with the first product or first section; and
   further in response to the establishing the communication channel, transmit the chat GUI to the second device.

9. The system of claim 7, the establishing the communication channel between the first device and the second device being further in response to receiving a user request to interact with an employee of the store.

10. The system of claim 7, the processor-based application further causing the one or more processors to provide, via the customer GUI, instructions on how to locate the first product or the first section.

11. The system of claim 7, the communication channel remaining open after a time of purchase, the method further comprising receiving, by the server, post-purchase questions directed towards a user of the second device.

12. The system of claim 7, the customer GUI being part of an application installed on the first device, the processor-based application further causing the one or more processors to, during a set-up of the application, receive data identifying the customer as a customer user.

13. A computer program product, comprising a non-transitory computer-readable medium having a computer-readable program code embodied therein to be executed by one or more processors, the program code including instructions to:
  determine that a first device is in proximity of a retail business, wherein determining that the first device is in proximity further includes:
    determining a geolocation of the first device;
    generating a geofence around the retail business; and
    determining that the first device is within the geofence;
  retrieve, from a repository associated with the retail business, data indicative of products sold in the retail business and of sections in the retail business;
  transmit a first set of data indicative of a customer graphical user interface (GUI) to the first device, wherein the customer GUI includes the products and sections, the customer GUI being a part of a webpage or web application window being accessed via the Internet;
  transmit instructions to display the customer GUI on a display of the first device;
  in response to the customer selecting, on the customer GUI, a first product or a first section, establish a communication channel between the first device and a second device via the Internet;
  in response to establishing the communication channel, transmit a chat GUI to the first device, wherein the chat GUI is operable to transmit communication data over the communication channel; and
  store the communication data from the chat GUI.

14. The computer program product of claim 13, the program code further including instructions to:
  transmit a second set of data indicative of an employee GUI to a second device and instructions to display the employee GUI on a display of the second device, the second device being associated with an employee, wherein the employee is associated with the first product or first section; and
  further in response to the establishing the communication channel, transmit the chat GUI to the second device.

15. The computer program product of claim 13, the establishing the communication channel between the first device and the second device being further in response to receiving a user request to interact with an employee of the store.

16. The computer program product of claim 13, the program code further including instructions to provide, via the customer GUI, instructions on how to locate the first product or the first section.

17. The computer program product of claim 13, the communication channel remaining open after a time of purchase, the method further comprising receiving, by the server, post-purchase questions directed towards a user of the second device.

18. The computer program product of claim 13, the customer GUI being part of an application installed on the first device, the program code further including instructions to, during a set-up of the application, receive data identifying the customer as a customer user.

19. A method comprising:
  determining, by a server, that a first device is in proximity of a retail business, wherein determining that the first device is in proximity further includes:
    determining a geolocation of the first device;
    generating a geofence around the retail business; and
    determining that the first device is within the geofence;
  in response to the customer selecting, a first product or a first section in the retail business, transmitting, by the server, an alert to devices associated with each employee within the retail business;
  transmitting, by the server as part of the alert, a second set of data indicative of an employee GUI to a second device and instructions to display the employee GUI on a display of the second device, the second device being associated with an employee, the employee GUI including a prompt to take responsibility for the customer selecting the first product or first section, the employee GUI being a part of a webpage or web application window being accessed via the Internet;
  in response to the employee selecting, on the employee GUI, to take taker responsibility, establishing, by the server, a communication channel between the first device and a second device via the Internet;
  in response to establishing the communication channel, transmitting, by the server, a chat GUI to the first device, wherein the chat GUI is operable to transmit communication data over the communication channel; and
  storing, by the server, the communication data from the chat GUI.

20. The method of claim 19, wherein when the customer selection of the first product or first section has been unanswered for a predetermined period of time, transmitting an alert to a predetermined employee on a third device.

* * * * *